US010552057B2

(12) United States Patent
Kesavan et al.

(10) Patent No.: US 10,552,057 B2
(45) Date of Patent: Feb. 4, 2020

(54) METHODS FOR IMPROVING JOURNAL PERFORMANCE IN STORAGE NETWORKS AND DEVICES THEREOF (71) Applicant: NetApp, Inc., Sunnyvale, CA (US)

(72) Inventors: Ram Kesavan, Sunnyvale, CA (US); Ananthan Subramanian, San Ramon, CA (US); Hiroshi Ishii, Sunnyvale, CA (US); Abdul Basit, Morrisville, NC (US); Joseph Brown, Jr., Raleigh, NC (US); Rohit Singh, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 120 days.

(21) Appl. No.: 15/167,924

(22) Filed: May 27, 2016

(65) Prior Publication Data
US 2017/0344282 A1 Nov. 30, 2017

(51) Int. Cl.
*G06F 3/06* (2006.01)

(52) U.S. Cl.
CPC ........... *G06F 3/0619* (2013.01); *G06F 3/061* (2013.01); *G06F 3/065* (2013.01); *G06F 3/0655* (2013.01); *G06F 3/0688* (2013.01)

(58) Field of Classification Search
CPC ........ G06F 3/0619; G06F 3/061; G06F 3/065; G06F 3/0655; G06F 3/0688
See application file for complete search history.

(56) References Cited

U.S. PATENT DOCUMENTS

| 7,805,632 | B1* | 9/2010 | Luke | G06F 11/1471 |
| | | | | 714/36 |
| 8,271,724 | B1* | 9/2012 | Scott | G06F 3/061 |
| | | | | 707/644 |
| 8,818,951 | B1* | 8/2014 | Muntz | G06F 11/1458 |
| | | | | 707/639 |
| 2002/0083037 | A1* | 6/2002 | Lewis | G06F 11/14 |
| 2007/0276878 | A1* | 11/2007 | Zheng | G06F 16/125 |
| 2017/0262463 | A1* | 9/2017 | Dar | G06F 3/0608 |

\* cited by examiner

*Primary Examiner* — Ann J Lo
*Assistant Examiner* — Jane Wei
(74) *Attorney, Agent, or Firm* — Pepper Hamilton LLP (57) ABSTRACT

A method, non-transitory computer readable medium and storage server computing device that determines when a generated storage operation corresponds with one of a set of predefined storage operations. The storage operation is executed and a result of the execution of the storage operation is withheld from a file system, when the determining indicates that the storage operation corresponds with one of the set of predefined storage operations. A determination is made when a consistency point operation has completed. The result of the execution of the storage operation is presented to the file system, when the determining indicates that a consistency point operation has completed. This technology reduces the number of storage operations that are required to be journaled to maintain consistency of a file system, thereby reducing the runtime resources required to facilitate the journaling and replay resource required to replay the storage operations in a journal following a recovery.

9 Claims, 4 Drawing Sheets

METHODS FOR IMPROVING JOURNAL PERFORMANCE IN STORAGE NETWORKS AND DEVICES THEREOF

FIELD

This technology relates to facilitating data integrity in data storage networks, and more particularly to methods and devices for improving journal performance in storage operations.

BACKGROUND

Storage servers can store data redundantly, e.g., across multiple data storage devices. Storage servers may employ various forms of data storage devices, such as hard disk drives, solid state drives, flash drives, or tape devices for example. The data storage devices are typically implemented as one or more storage volumes that comprise a subset of the data storage devices, in which the volumes define an overall logical arrangement of storage space. For example, a storage server can serve a large number of discrete volumes each generally associated with its own file system.

To improve performance, storage servers can temporarily store various storage modify operations and associated data received from client devices in a region of system memory. Storage operations generally can be classified into storage operations that modify the state of the storage system and those that only read the state of the storage system. By storing the storage modify operations and data they receive in system memory, the storage servers can immediately return an acknowledgement message to the client devices rather than wait for slower data storage devices to actually store the data prior to the acknowledgement being sent. However, system memory can be erased before the data is stored to data storage devices, e.g., in the event of a power (or other) failure.

To eliminate the possibility of data loss in such circumstances, storage servers may also store the storage operations and associated data in non-volatile random access memory (NVRAM), e.g., in a log stored in the NVRAM. By initially storing the storage operations in the log, the storage server can immediately return an acknowledgment to the client devices rather than wait for the operation to complete on one or more data storage devices.

Moreover, in the event of failure of the storage server, the storage operations can be replayed, thereby preventing loss of data. The NVRAM can have various associated circuitry to prevent data loss, e.g., battery backup, flash-type memory, etc. By logging storage operations as "journal" entries in the log, a storage server can conform with data storage protocols that require the storage server only acknowledge storage operations after writing data to persistent storage. Journaled storage operations can include external operations received from client devices (e.g., create file, write data, delete data, etc.) as well as internal operations generated in order to manage a hosted file system, for example.

The log can accumulate storage operations until a consistency point is triggered. Consistency points can be triggered at various time intervals (e.g., fixed time intervals), or when other events arise, e.g., the NVRAM is almost fully filled. At each consistency point, data is transferred from the storage server system memory (e.g., the NVRAM) to underlying data storage volumes on data storage devices as a result of executing the storage operations in the log, and the system memory is cleared of the transferred data upon successful transfer. If the storage server's operations are interrupted unexpectedly, e.g., because of power failure or other subsystem problem, its operating system or file system can recover by using information stored in the log between the time of the last consistency point and the unexpected interruption, e.g., by using a replay operation.

Storage servers incur runtime costs in order to perform the journaling operations and populate and maintain the log, including with respect to processor utilization and NVRAM utilization. Additionally, replay costs are incurred by storage servers when the storage servers are recovering from a crash or other failure. In particular, the replay costs include replaying the storage operations in the log in the NVRAM. These costs impact performance of the storage servers, as well as the duration the storage servers are unavailable to service storage operations during a recovery.

DETAILED DESCRIPTION

Figure 1:
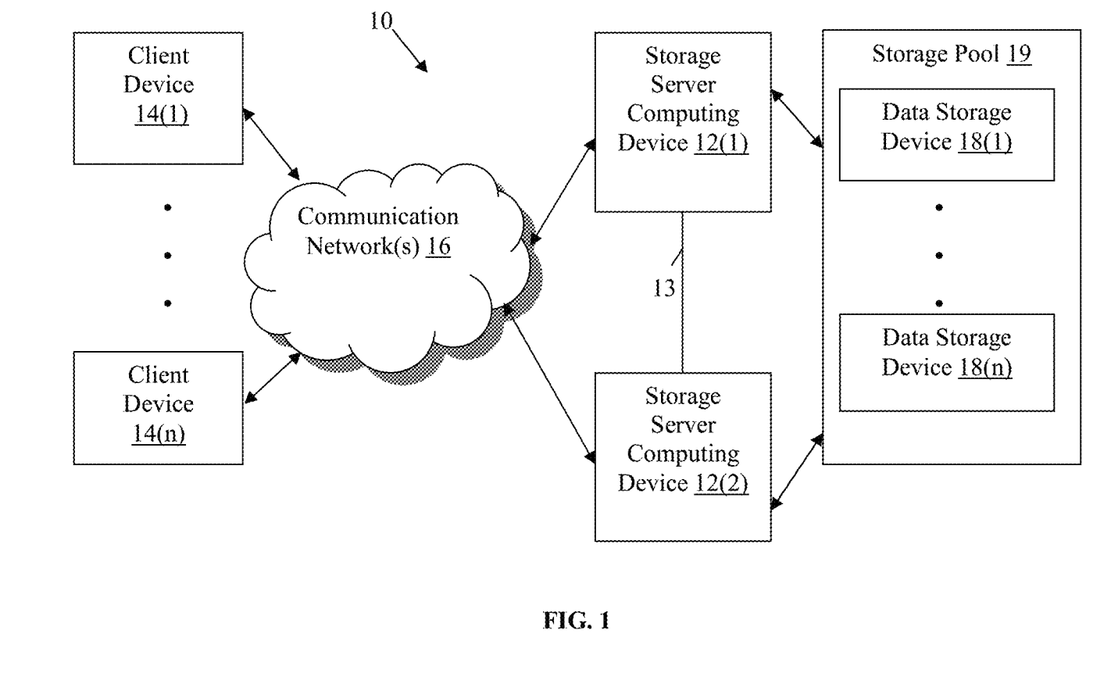
FIG. 1 is a block diagram of a network environment with an exemplary high availability (HA) pair of storage server computing devices.

A network environment 10 including exemplary storage server computing devices 12(1) and 12(2) arranged as a high availability (HA) pair and coupled together via an interconnect 13 is illustrated in FIG. 1. The storage server computing devices 12(1) and 12(2) in this example are coupled to client devices 14(1)-14(n) via communication network(s) 16 and data storage devices 18(1)-18(n) in a storage pool 19 via another communication network, direct connection, or switch (not shown), although this network environment 10 can include other numbers and types of systems, devices, components, and/or elements in other configurations. Additionally, the network environment 10 may include other network devices such as one or more routers and/or switches, for example, which are well known in the art and thus will not be described herein. This technology provides a number of advantages including methods, non-transitory computer readable media, and devices that reduce runtime costs associated with journaling storage operations and replay costs associated with replaying a journal following a recovery.

Figure 2:
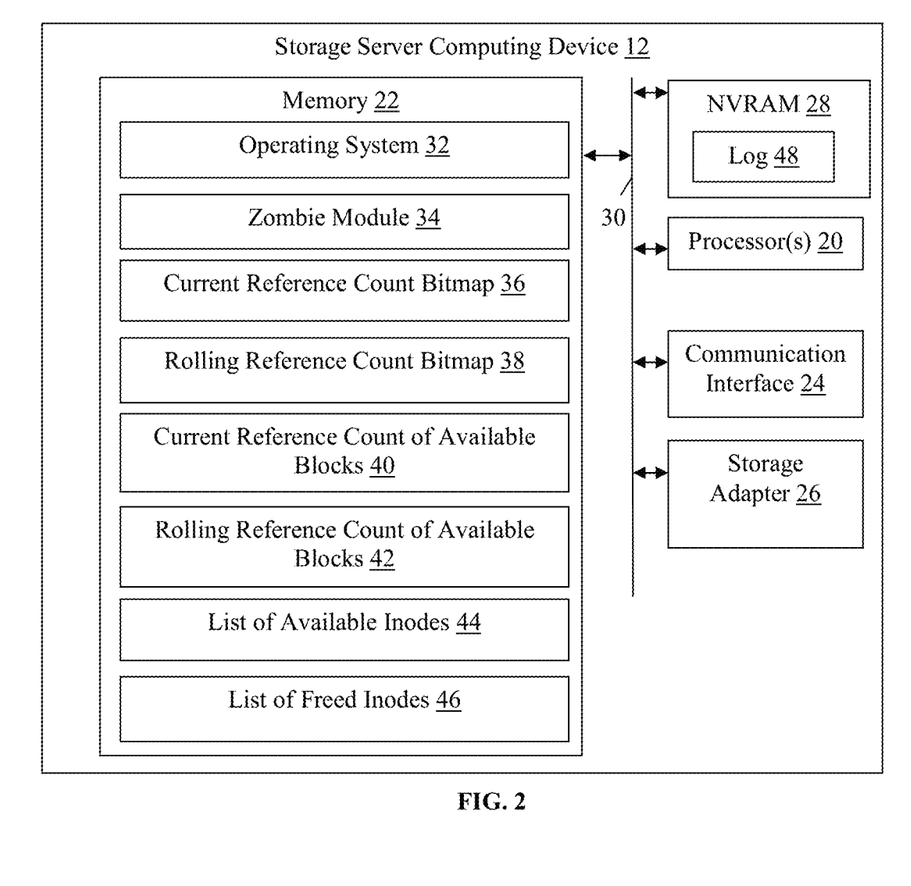
FIG. 2 is a block diagram of one of the exemplary storage server computing devices shown in FIG. 1.

Referring to FIG. 2, a block diagram of one of the exemplary storage server computing devices 12(1) and 12(2) is illustrated. The storage server computing device 12 generally provides file services relating to the organization of information on the data storage devices 18(1)-18(n) on behalf of the client devices 14(1)-14(n). In this example, the storage server computing device 12 includes processor(s) 20, a memory 22, a communication interface 24, a storage adapter 26, and a non-volatile random access memory (NVRAM) 28, which are coupled together by a bus 30 or other communication link.

The processor(s) 20 of the storage server computing device 12 may execute a program of stored instructions for one or more aspects of the this technology, as described and illustrated by way of the embodiments herein, although the processor(s) 20 could execute other numbers and types of programmed instructions. The processor(s) 20 in the storage server computing device 12 may include one or more central processing units (CPUs) or general purpose processors with one or more processing cores, for example.

The memory 22 of the storage server computing device 12 may include any of various forms of read only memory (ROM), random access memory (RAM), flash memory, non-volatile or volatile memory, or the like, or a combination of such devices, for example. In this example, the memory includes an operating system 32, a zombie module 34, a current reference count bitmap 36, a rolling reference count bitmap 38, a current reference count of available blocks 40, a rolling reference count of available blocks 42, a list of available inodes, and a list of freed inodes, although other types and/or numbers of applications or modules can also be included in other examples.

The operating system 32 is configured to functionally organize stored data by invoking storage operations to facilitate file services provided by the storage server computing device 12. In particular, the operating system 32 implements a file system to logically organize information as a hierarchical structure of directories and files on the data storage devices 18(1)-18(n). Accordingly, the operating system 32 cooperates with the storage adapter 26 to access information requested by the client devices 14(1)-14(n) and stored on the data storage devices 18(1)-18(n), among other functions.

The zombie module 34 is configured to free blocks and inodes associated with files that have been deleted by a storage operation received from one of the client devices 14(1)-14(n) or an internally-generated storage operation, for example. Deleted files are marked as zombie files so that they can be removed from the file system that is visible to the client device 14(1)-14(n) synchronously, but lazily or asynchronously deleted from the data storage devices 18(1)-18(n) by the zombie module 34 since the removal from the data storage devices 18(1)-18(n) can take a significant amount of time.

The current reference count bitmap 36 represents the available blocks on the data storage devices 18(1)-18(n) that can be used to store data by the file system while a current consistency point operation is in process. The rolling reference count bitmap 38 represents blocks on the data storage devices 18(1)-18(n) that were freed (e.g., by a truncate indirect storage operation) during a current consistency point operation.

Similarly, the current reference count of available blocks 40 represents the number of blocks on the data storage devices 18(1)-18(n) that can be used to store data by the file system while a current consistency point operation is in process. The rolling reference count of available blocks represents the number of blocks on the data storage devices 18(1)-18(n) that were freed (e.g., by a truncate indirect storage operation) during a current consistency point operation.

Additionally, the list of available inodes 44 includes an indication of the inode numbers that are available for use by the file system to store new files on the data storage devices 18(1)-18(n) while a current consistency point operation is in process. The list of freed inodes 46 includes an indication of inode numbers that were freed (e.g., by a remove zombie storage operation) during a current consistency point operation.

The information contained in the rolling reference count bitmap 38, rolling reference count of available blocks 42, and list of freed inodes is not available to the file system until after completion of a current consistency point operation. Subsequent to completion of a consistency point operation, the storage server computing device 12 updates the current reference count bitmap 36 based on the rolling reference count bitmap 38, the current reference count of available blocks 40 based on the rolling reference count of available blocks 42, and the list of available inodes 44 based on the list of freed inodes 46.

Accordingly, an indication, and the number, of blocks freed during a consistency point operation, as well as the inodes numbers that were freed during the consistency point operation, are not presented to the file system until completion of the consistency point operation. Withholding the indication, and the number, of blocks freed during the consistency point operation, as well as the inodes numbers that were freed during the consistency point operation, facilitates not journaling the storage operations that freed the blocks (e.g., truncate indirect and remove zombie storage operations), as described and illustrated in more detail later.

The communication interface 24 of the storage server computing device 12 can include one or more network interface controllers (NICs) for operatively coupling and communicating between the storage server computing device 12 and the client devices 14(1)-14(n), which are coupled together by the communication network(s) 16, although other types and numbers of communication networks or systems with other types and numbers of connections and configurations to other devices and elements also can be used.

By way of example only, the communication network(s) 16 can use TCP/IP over Ethernet and industry-standard protocols, including NFS, CIFS, SOAP, XML, LDAP, and SNMP, although other types and numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

The storage adapter 26 can cooperate with the operating system 32 to access information requested by the client devices 14(1)-14(n). The information may be stored on the data storage devices 18(1)-18(n) in logical volumes, for example. The storage adapter 26 includes input/output (I/O) or communication interface circuitry that couples to the data storage devices 18(1)-18(n) over an I/O interconnect arrangement such as a conventional high-performance, Fibre Channel serial link topology, SAS, SCSI, or SATA, for example. The storage adapter 26 can communicate with the data storage devices 18(1)-18(n) over a network (or switch) (not shown), for example.

The NVRAM 28 in this particular example provides fault-tolerant backup of data, enabling the integrity of storage operations to survive a service interruption based on a power failure or other fault. Additionally, the NVRAM 28 allows some storage operations (e.g., write and delete requests) received from the client devices 14(1)-14(n) to be acknowledged before being committed to the data storage devices 18(1)-18(n) asynchronously. The size of the NVRAM 28 can be variable and optionally sufficiently large to log a predefined number of storage operations and associated data.

The NVRAM 28 can store a log 48, which can be a file or other data structure that is used to journal storage operations in sequential order as received from the client devices 14(1)-14(n). As the storage server computing device 12 receives storage operations (e.g., to create files, write data, etc.), the storage server computing device 12 can first store them in the log 48. When replayed, the result is as if the received storage operations were directly committed to the data storage devices 18(1)-18(n). In some examples, other persistent media may be employed to store the log 48, e.g., solid state drives or other non-volatile storage. Accordingly, the contents of the NVRAM 28 can be mirrored between storage server computing devices, and replayed by a surviving storage server computing device, in order to facilitate high availability failover.

Optionally, the log 48 can be implemented as a double buffer such that newly received or generated storage operations are input into a first portion of a buffer while storage operations are being committed to the data storage devices 18(1)-18(n) from a second portion of the buffer. Subsequent to committing all of the storage operations from the second portion of the buffer during a consistency point operation, a consistency point is established and the storage server computing device 12 effectively switches roles of the first and second buffer portions and initiates another consistency point operation.

Referring back to FIG. 1, each of the client devices 14(1)-14(n) in this example includes a processor, a memory, a communication interface, and optionally an input device, and a display device, which are coupled together by a bus or other link, although each of the client devices 14(1)-14(n) can have other types and numbers of components or other elements and other numbers and types of network devices could be used.

The client devices 14(1)-14(n) may run interface applications that provide an interface to make requests for and send content and/or data to the storage server computing device 12 via the communication network(s) 16, for example. Each of the client devices 14(1)-14(n) may be a conventional personal computer, a tablet computing device, a smart phone, a virtual machine running in a cloud, an application server hosting applications that utilize backend storage, or other processing and/or computing device, for example.

The data storage devices 18(1)-18(n) can be hard disk drives, solid state drives, flash drives (e.g., in an all flash array), optical disk-based storage, any combination thereof, or any other type of stable, non-volatile storage suitable for storing files or objects in storage volumes for short or long term retention, for example. The data storage devices 18(1)-18(n) optionally host one or more volumes based on a Redundant Array of Inexpensive Disks (RAID) architecture or other topology facilitating data persistency, although other types and numbers of volumes in other topologies can also be used.

Although examples of the storage server computing devices 12(1) and 12(2), client devices 14(1)-14(n), and data storage devices 18(1)-18(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
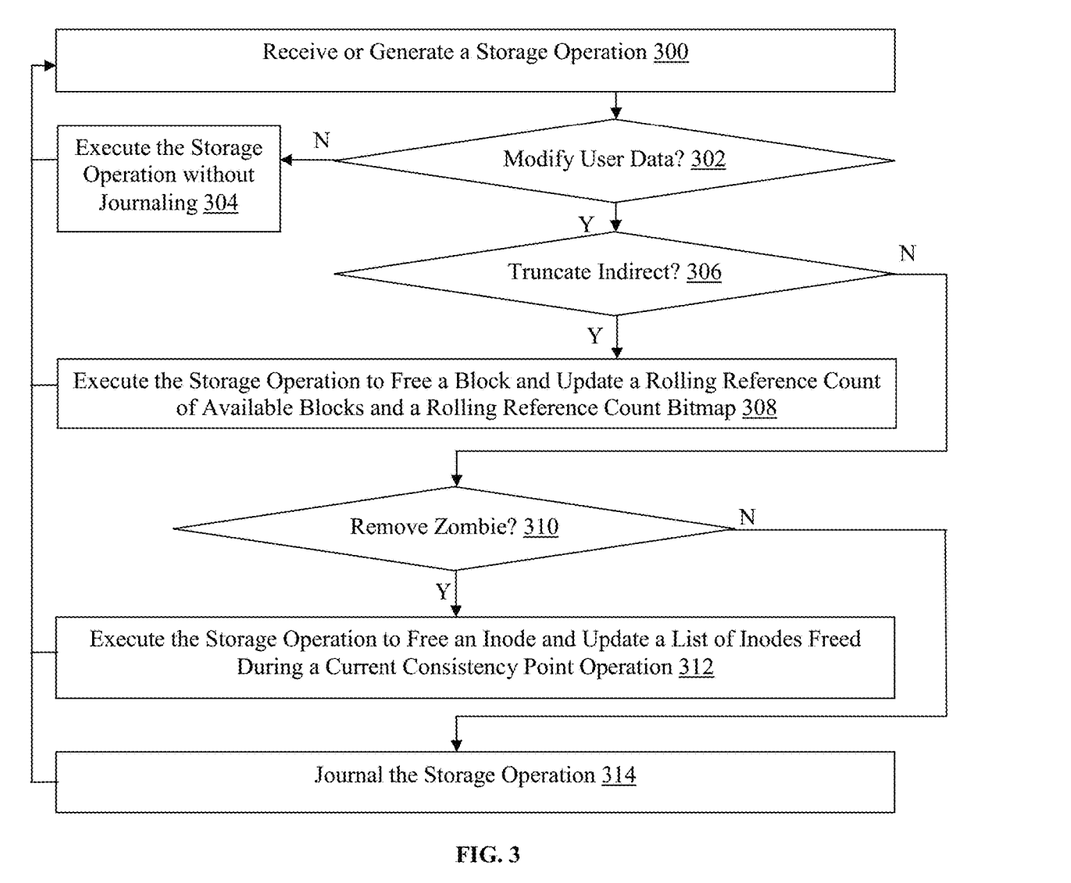
FIG. 3 is a flowchart of an exemplary method for improving journal performance in a storage network by withholding results of certain storage operations until after completion of a consistency point operation.

An exemplary method for selectively journaling storage operations will now be described with reference to FIGS. 1-4. Referring more specifically to FIG. 3, is a flowchart of an exemplary method for improving journal performance in a storage network by withholding results of certain storage operations until after completion of a consistency point operation is illustrated. In step 300 in this particular example, one of the storage server computing devices 12(1) and 12(2) receives a storage operation.

The storage operation can be received from one of the client devices 14(1)-14(n) and can be a command to read, create, or write data to a file on one or more of the data storage devices 18(1)-18(n), for example. Alternatively, the storage operation can be an internal storage operation generated by the one of the storage server computing devices 12(1) and 12(2) (e.g., by a file system of the one of the storage server computing devices 12(1) and 12(2)), or can comprise other types of storage operations received from one or more of the client devices 14(1)-14(n).

In step 302, in this example the one of the storage server computing devices 12(1) and 12(2) determines whether the storage operation modifies or impacts user data. For example, a read storage operation received from one of the client devices 14(1)-14(n) does not modify user data, but write and delete storage operations received from one of the client devices 14(1)-14(n) do modify user data. If the one of the storage server computing devices 12(1) determines that the received storage operation does not modify user data, then the No branch is taken to step 304.

In step 304, the one of the storage server computing devices 12(1) and 12(2) executes the storage operation without journaling the storage operation or inserting the storage operation into the log 48 in the NVRAM 28. For example, the one of the storage server computing devices 12(1) and 12(2) can execute a read storage operation received from one of the client devices 14(1)-14(n) by retrieving data from one of the data storage devices 18(1)-18(n) and returning the data to the one of the client devices 14(1)-14(n) via the communication network(s) 16.

The read storage operation in this example does not have to be journaled because if the one of the storage server computing devices 12(1) and 12(2) fails before the read storage operation is completed, consistency of the file system will not be affected by the failure because the read storage operation does not modify any user data. In the event of a failure, the one of the client devices 14(1)-14(n) that generated the read storage operation in this example will not receive the requested data and may simply retry the submission of the read storage operation, for example.

Other types of storage operations can be received or generated by the one of the storage server computing devices 12(1) and 12(2) that do not modify user data and are executed without being journaled in step 304. However, if the one of the storage server computing devices 12(1) and 12(2) determines in step 302 that the received or generated storage operation does modify user data, then the Yes branch is taken to step 306.

In one example, a delete file storage operation can be received from one of the client devices 14(1)-14(n) and logged in the NVRAM 28. The one of the storage server computing devices 12(1) and 12(2) then removes the file from the client-visible namespace into a hidden space. The file in the hidden space is referred to as a zombie file. The zombie module 34 then asynchronously generates truncate indirect storage operations, each of which frees a plurality of blocks of the deleted file for reuse by the file system.

The truncate indirect storage operations work from an edge of a tree of blocks that constitute the zombie file in order to effectively shrink the zombie file. After a series of truncate indirect storage operations have reduced the zombie file down to zero length, the zombie module 34 generates a remove zombie storage operation, which frees the inode associated with the deleted file.

Accordingly, in step 306 in this particular example, the one of the storage server computing devices 12(1) and 12(2) determines whether the storage operation is an internal truncate indirect storage operation generated by the zombie module 34. If the one of the storage server computing devices 12(1) and 12(2) determines that the storage operation is a truncate indirect storage operation, then the Yes branch is taken to step 308.

In step 308, the one of the storage server computing devices 12(1) and 12(2) executes the truncate indirect storage operation to free blocks of a deleted file on one of the data storage devices 18(1)-18(n). In order to free the blocks in this example, the one of the storage server computing devices 12(1) and 12(2) updates the rolling reference count of available blocks 42 (e.g., by incrementing) and the rolling reference count bitmap 38 at a location corresponding to the freed blocks. The rolling reference count of available blocks 42 and the rolling reference count bitmap 38 are not available to the file system, and the result of the truncate indirect storage operation is withheld from the file system, until a consistency point operation has completed.

Accordingly, the truncate indirect storage operation is not journaled (e.g., stored in the log 48 in the NVRAM 28) in this example, and will not be replayed in the event of a failure of the one of the storage server computing devices 12(1) and 12(2). Therefore, the result of the truncate indirect storage operation is withheld from the file system so that other storage operations that are journaled and will be replayed during a recovery do not expect the result of the truncate indirect operation that will not have occurred (and will not occur during replay) in the event of the failure of the one of the storage server computing devices 12(1) and 12(2) and associated rollback to a prior consistency point. Use of the freed blocks, or additional storage space corresponding to the freed blocks, by a journaled storage operation prior to completion of a current consistency point operation could result in an error or inconsistency in the file system in the event of a failure.

For example, a storage operation (e.g., a write storage operation) that is journaled cannot use a block that was freed by a truncate indirect storage operation to store data on one of the data storage devices 18(1)-18(n). The freed block cannot be used because the truncate indirect storage operation will not have freed that block if the file system is returned to a prior consistency point, and the truncate indirect storage operation will not be replayed during recovery since it was not journaled. Similarly, the reference count of available blocks is withheld in this example so that journaled storage operations do not expect more available blocks or storage space when replayed during a recovery than may actually be available.

Referring back to step 306, if the one of the storage server computing devices 12(1) and 12(2) determines that the storage operation is not a truncate indirect storage operation, then the No branch is taken to step 310. In step 310, the one of the storage server computing devices 12(1) and 12(2) determines whether the storage operation is an internal remove zombie storage operation generated by the zombie module 34. If the one of the storage server computing devices 12(1) and 12(2) determines that the storage operation is a remove zombie storage operation, then the Yes branch is taken to step 312.

In step 312, the one of the storage server computing devices 12(1) and 12(2) executes the remove zombie storage operation to free an inode number associated with a file deleted from one or more of the data storage devices 18(1)-18(n). In order to free the inode in this example, the one of the storage server computing devices 12(1) and 12(2) updates the list of freed inodes 46 (e.g., by inserting a number of the inode). The list of freed inodes 46 is not available to the file system, and the result of the remove zombie storage operation is withheld from the file system, until a current consistency point operation has completed.

Accordingly, the remove zombie storage operation is not journaled (e.g., stored in the log 48 in the NVRAM 28) in this example, and will not be replayed in the event of a failure of the one of the storage server computing devices 12(1) and 12(2). Therefore, the result of the remove zombie storage operation is withheld from the file system so that other storage operations that are journaled and will be replayed during a recovery do not expect the result of the remove zombie operation that will not have occurred (and will not occur during replay) in the event of the failure of the one of the storage server computing devices 12(1) and 12(2) and associated rollback to a prior consistency point.

For example, a storage operation (e.g., a create file storage operation) that is journaled cannot use the inode number of the inode that was freed by the remove zombie storage operation to associate with a new file to be stored on one of the data storage devices 18(1)-18(n). The freed inode cannot be used because the remove zombie storage operation will not have freed that inode if the file system is returned to a prior consistency point, and will not be replayed during recovery since it was not journaled. Accordingly, use of the freed node by a journaled storage operation could result in an error or inconsistency in the file system.

Referring back to step 310, if the one of the storage server computing devices 12(1) and 12(2) determines that the storage operation is not a remove zombie storage operation, then the No branch is taken to step 314. In step 314, the one of the storage server computing devices 12(1) and 12(2) journals the storage operation, such as by storing the storage operation in the log 48 in the NVRAM 28 in this example, since the storage operation was previously determined to modify user data in step 302. The log 48 in the NVRAM 285 can then be accessed by the one of the storage server computing devices 12(1) and 12(2) when subsequently committing the data to one or more of the data storage devices 18(1)-18(n), as described and illustrated in more detail later with reference to step 402 of FIG. 4.

Optionally, subsequent to journaling the storage operation in the log 48, the one of the storage server computing devices 12(1) and 12(2) can send an acknowledgement message to the one of the client devices 14(1)-14(n) via the communication network(s) 16 if the storage operation was received from the one of the client devices 14(1)-14(n) in step 300 and not generated by the one of the storage server computing devices 12(1) and 12(2). Accordingly, in this example some storage operations, including truncate indirect and remove zombie operations, are advantageously not journaled even though these storage operations impact user data.

Figure 4:
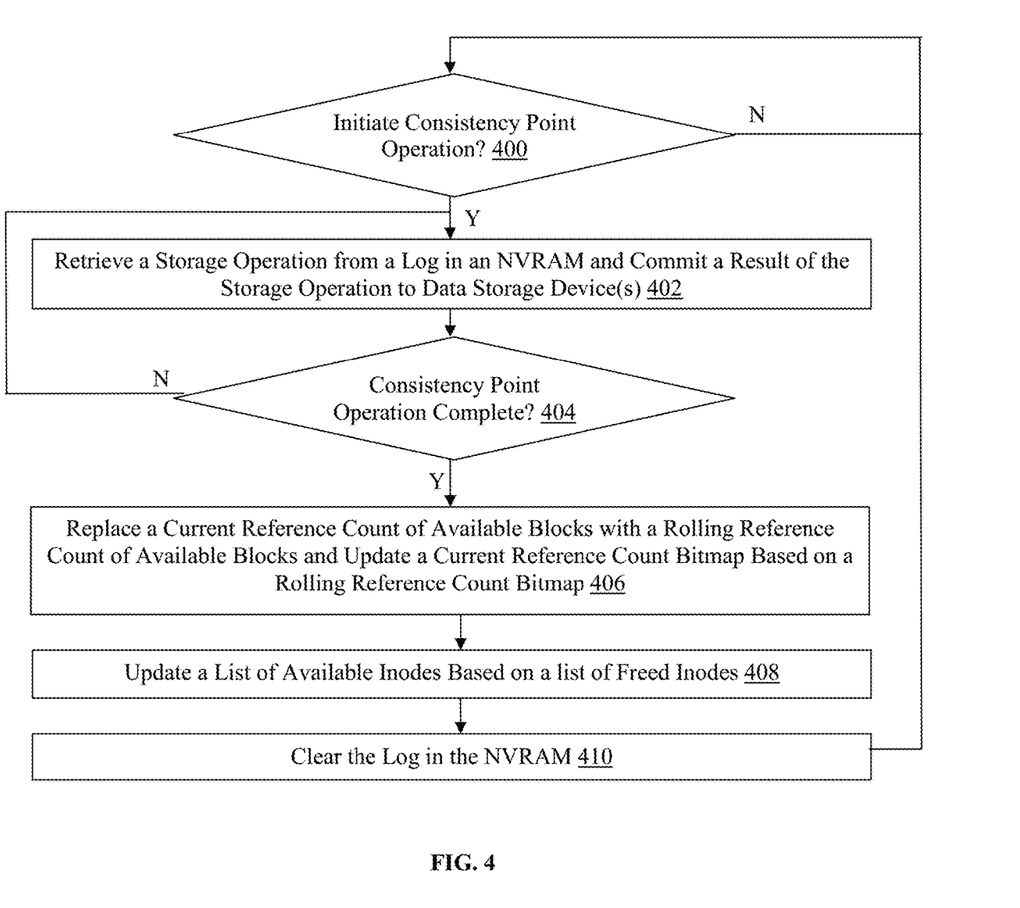
FIG. 4 is a flowchart of an exemplary method for improving journal performance in a storage network by presenting results of certain storage operations to a file system after completion of a consistency point operation.

Referring more specifically to FIG. 4, a flowchart of an exemplary method for improving journal performance in a storage network by presenting results of certain storage operations to a file system after completion of a consistency point operation is illustrated. In step 400, one of the storage server computing devices 12(1) and 12(2) determine whether a consistency point operation should be initiated. Consistency point operations can be initiated at intervals and based on expiration of an established time period. In another example, consistency point operations can be initiated based on a portion of the NVRAM 40 exceeding a capacity threshold, although consistency point operations can be initiated based on other types and/or numbers of criteria.

The consistency point operation generally processes storage operations in the log 48 in the NVRAM 28 in order to establish a point at which the file system is consistent, which can be used in the event of a failure. If the one of the storage server computing devices 12(1) and 12(2) determines that a consistency point operation should not be initiated, then the No branch is taken back to step 400 and the one of the storage server computing devices 12(1) and 12(2) effectively waits for the consistency point operation to be initiated in this example. However, if the one of the storage server computing devices 12(1) and 12(2) determines that a consistency point operation should be initiated, then the Yes branch is taken to step 402.

In step 402, the one of the storage server computing devices 12(1) and 12(2) commits a result of the storage operation from the memory 22 (e.g., dirty buffers and/or dirty inodes in a DRAM) to one or more of the data storage devices 18(1)-18(n). Accordingly, the one of the storage server computing devices 12(1) and 12(2) can commit a write storage operation received from one of the client devices 14(1)-14(n) that was previously acknowledged, for example, although other types of storage operations that modify user data can also be committed in step 402.

In step 404, the one of the storage server computing devices 12(1) and 12(2) determines whether the consistency point operation is complete. If the one of the storage server computing devices 12(1) and 12(2) determines that the consistency point operation is not complete, then the No branch is taken back to step 402, and another storage operation is committed. However, if the one of the storage server computing devices 12(1) and 12(2) determines that the consistency point operation is complete, then the Yes branch is taken to step 406.

In step 406, the one of the storage server computing devices 12(1) and 12(2) replaces the current reference count of available blocks 40 with the rolling reference count of available blocks 42 and updates the current reference count bitmap 36 based on the rolling reference count bitmap 38. Accordingly, subsequent to the completion of the consistency point operation, the results of any truncate indirect storage operation(s), which were previously withheld from the file system, are presented to the file system for use in processing subsequent storage operations. Optionally, the rolling reference count of available blocks 42 is updated based on, or replaced with, the current count of available blocks 40 and the rolling reference count bitmap 38 is also updated based on, or replaced with, the current reference count bitmap 36, in order to reflect updates that may have occurred as a result of executing journaled storage operations.

In step 408, the one of the storage server computing devices 12(1) and 12(2) updates the list of available inodes 44 based on the list of freed inodes 46. Accordingly, the one of the storage server computing devices 12(1) and 12(2) can insert the inode numbers in the list of freed inodes 46 into the list of available inodes 44, for example. Optionally, the one of the storage server computing devise 12(1) and 12(2) then clears the list of freed inodes 46 in step 408. Accordingly, any storage operations journaled after the completion of the consistency point operation can advantageously rely on the file system being consistent.

In step 410, the one of the storage server computing devices 12(1) and 12(2) clears the log 48 in the NVRAM 28 since all of the journaled storage operations have now been successfully committed. Optionally, the clearing of the log 48 can include clearing one portion of a double buffer in the NVRAM 28, for example. If there is a failure in this example, the one of the storage server computing devices 12(1) and 12(2) can effectively reconstruct the truncate indirect and remove zombie storage operations asynchronously. For example, the zombie module 34 can scan the file system and identify files marked as being zombie files prior to the failure event, and process those files by generating the truncate indirect and remove zombie storage operations.

Accordingly, with this technology, fewer storage operations need to be journaled in order to maintain consistency of a file system. By not journaling some storage operations, runtime costs can be reduced. Since the storage operations that were not journaled do not have to be replayed in the event of a failure, replay costs are also advantageously reduced. Therefore, with this technology, storage server resources are more effectively utilized, storage server performance is improved, and the duration of unavailability of a file system during a recovery is reduced.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    initiating, by a computing device, a consistency point operation that retrieves storage operations logged as journal entries in a log and commits a result of each of the storage operations to one or more data storage devices;
    executing, by the computing device, a storage operation, without journaling the storage operation in the log, and withholding from a file system a rolling reference count of available blocks that represents a number of blocks freed during execution of the storage operation, after the consistency point operation has initiated, and in response to determining that the storage operation, when executed, frees the number of blocks associated with a deleted file; and presenting, by the computing device, the rolling reference count of available blocks to the file system by updating a current reference count of available blocks based upon the rolling reference count of available blocks, when the consistency point operation is determined to be complete based on the log being cleared after the results of the storage operations in all of the journal entries are committed to the data storage devices.

2. The method of claim 1, wherein the withholding further comprises updating a rolling reference count bitmap to reflect the freeing of the number of blocks.

3. The method of claim 2, further comprising presenting, by the computing device, the rolling reference count bitmap to the file system by updating a current reference count bitmap based upon the rolling reference count bitmap, when the consistency point operation is determined to be complete based on the log being cleared after the results of the storage operations in all of the journal entries are committed to the data storage devices.

4. A non-transitory machine readable medium having stored thereon instructions for improved journal performance in a storage network comprising machine executable code which when executed by at least one machine causes the machine to:

initiate a consistency point operation that retrieves storage operations logged as journal entries in a log and commits a result of each of the storage operations to one or more data storage devices;

execute a storage operation, without journaling the storage operation in the log, and withhold from a file system a rolling reference count of available blocks that represents a number of blocks freed during execution of the storage operation, after the consistency point operation has initiated, and in response to determining that the storage operation, when executed, frees the number of blocks associated with a deleted file; and present the rolling reference count of available blocks to the file system by updating a current reference count of available blocks based upon the rolling reference count of available blocks, when the consistency point operation is determined to be complete based on the log being cleared after the results of the storage operations in all of the journal entries are committed to the data storage devices.

5. The non-transitory machine readable medium of claim 4, wherein the machine executable code when executed by the machine further causes the machine to update a rolling reference count bitmap to reflect the freeing of the number of blocks.

6. The non-transitory machine readable medium of claim 5, wherein the machine executable code when executed by the machine further causes the machine to present the rolling reference count bitmap to the file system by updating a current reference count bitmap based upon the rolling reference count bitmap, when the consistency point operation is determined to be complete based on the log being cleared after the results of the storage operations in all of the journal entries are committed to the data storage devices.

7. A computing device, comprising:

a memory containing machine readable medium comprising machine executable code having stored thereon instructions for improved journal performance in a storage network; and a processor coupled to the memory, the processor configured to execute the machine executable code to cause the processor to:

initiate a consistency point operation that retrieves storage operations logged as journal entries in a log and commits a result of each of the storage operations to one or more data storage devices;

execute a storage operation, without journaling the storage operation in the log, and withhold from a file system a rolling reference count of available blocks that represents a number of blocks freed during execution of the storage operation, after the consistency point operation has initiated, and in response to determining that the storage operation, when executed, frees the number of blocks associated with a deleted file; and present the rolling reference count of available blocks to the file system by updating a current reference count of available blocks based upon the rolling reference count of available blocks, when the consistency point operation is determined to be complete based on the log being cleared after the results of the storage operations in all of the journal entries are committed to the data storage devices.

8. The computing device of claim 7, wherein the processor is further configured to execute the machine executable code to further cause the processor to update a rolling reference count bitmap to reflect the freeing of the number of blocks.

9. The computing device of claim 8, wherein the processor is further configured to execute the machine executable code to further cause the processor to and present the rolling reference count bitmap to the file system by updating a current reference count bitmap based upon the rolling reference count bitmap, when the consistency point operation is determined to be complete based on the log being cleared after the results of the storage operations in all of the journal entries are committed to the data storage devices.

* * * * *